(12) United States Patent
Behrens

(10) Patent No.: US 6,250,010 B1
(45) Date of Patent: Jun. 26, 2001

(54) VEGETATION STRIP

(76) Inventor: Wolfgang Behrens, Trespenmoor 1, Gross Ippener (DE), D-27243

(*) Notice: Subject to any disclaimer, the term of this patent is extended or adjusted under 35 U.S.C. 154(b) by 0 days.

(21) Appl. No.: 09/297,599

(22) PCT Filed: Sep. 3, 1998

(86) PCT No.: PCT/DE98/02638

§ 371 Date: May 4, 1999

§ 102(e) Date: May 4, 1999

(87) PCT Pub. No.: WO99/13703

PCT Pub. Date: May 25, 1999

(30) Foreign Application Priority Data

Sep. 16, 1997 (DE) .............................................. 197 40 682

(51) Int. Cl.[7] .................................................. A01C 1/04
(52) U.S. Cl. ................................................ 47/56; 47/65.9
(58) Field of Search ........................ 47/56, 65.9, 1.01 F, 47/1.01 R, 9

(56) References Cited

U.S. PATENT DOCUMENTS

| | | | | |
|---|---|---|---|---|
| 2,192,939 | * | 3/1940 | Slayter et al. ............................ | 47/56 |
| 2,923,093 | * | 2/1960 | Allen ........................................ | 47/56 |
| 3,160,986 | * | 12/1964 | Watson et al. ............................ | 47/56 |
| 4,421,807 | * | 12/1983 | Clausing et al. ......................... | 428/41 |
| 4,459,788 | * | 7/1984 | Bockwinkel et al. ................... | 52/535 |
| 4,751,122 | * | 6/1988 | May ......................................... | 428/41 |
| 4,879,172 | * | 11/1989 | Meunier . | |
| 4,944,818 | * | 7/1990 | Dybsky et al. ......................... | 156/71 |
| 4,982,526 | * | 1/1991 | Miyachi .................................. | 47/56 |
| 5,095,068 | * | 3/1992 | Chiu ....................................... | 524/525 |
| 5,224,292 | * | 7/1993 | Anton ..................................... | 47/56 |
| 5,226,255 | * | 7/1993 | Robertson ............................... | 47/56 |
| 5,390,442 | * | 2/1995 | Behrens ................................. | 47/59 |
| 5,608,989 | * | 3/1997 | Behrens ................................. | 47/65.9 |
| 5,724,766 | * | 3/1998 | Behrens ................................. | 47/56 |
| 5,765,304 | * | 6/1998 | Clark ..................................... | 47/56 X |
| 5,836,107 | * | 11/1998 | Behrens ................................. | 47/56 |
| 5,974,735 | * | 11/1999 | Behrens ................................. | 47/58.1 |

FOREIGN PATENT DOCUMENTS

| | | | |
|---|---|---|---|
| 3408698 | * | 9/1985 | (DE) . |
| 361716 | * | 3/1988 | (DE) . |
| 3815662 | * | 12/1988 | (DE) . |
| 3823365 | * | 2/1989 | (DE) . |
| 4219275 | * | 12/1993 | (DE) . |
| 42 19 275 | * | 6/1994 | (DE) . |
| 19523406 | * | 12/1996 | (DE) . |
| 880692 | * | 7/1997 | (DE) . |
| 297 08 733 | | 7/1997 | (DE) . |
| 19714414 | * | 4/1999 | (DE) . |
| 172839 | * | 6/1986 | (EP) . |
| 0 172 839 | | 5/1990 | (EP) . |
| 09025631 | * | 1/1997 | (JP) . |
| 10108545 | * | 4/1998 | (JP) . |
| WO 8503842 | * | 9/1985 | (WO) . |

\* cited by examiner

*Primary Examiner*—Peter M. Poon
*Assistant Examiner*—Son T. Nguyen
(74) *Attorney, Agent, or Firm*—Collard & Roe, PC

(57) ABSTRACT

A vegetation body in the form of sheeting is disclosed, consisting of a structural mat, in particular a looped mat which is arranged on at least one substrate, and the structural mat can be filled with a substrate material and with a plant material capable of germinating, in particular seeds, sprouts, spores or spore parts. The vegetation body in the form of sheeting according to this invention is characterized in that the structural mat is arranged on the substrate in such a way that a first side edge area of the structural mat extends over a first side edge of the substrate, and an opposite second side edge area of the substrate extends beneath a second side edge of the structural mat, so that the structural mat and the substrate overlap one another.

5 Claims, 1 Drawing Sheet

VEGETATION STRIP

BACKGROUND OF THE INVENTION

1. Field of the Invention

This invention concerns a vegetation body in the form of sheeting with a structured mat in particular a looped mat.

2. The Prior Art

Such vegetation bodies in the form of sheeting are known from European Patent No. 172,839 B1 and German Patent No. 4,219,275 C2, for example. These and similar vegetation bodies in the form of sheeting are used in particular for roof sodding. To sod a flat or pitched roof with such mats, the vegetation bodies are laid side by side on the roof, with the vegetation bodies being laid as sheeting with end-to-end butt joints. The vegetation bodies are either laid directly on the roof surface or on a substrate layer applied to the roof. Before laying the sheeting on the roof, the vegetation bodies in the form of sheeting are usually precultivated, i.e., before being installed on the roof, the vegetation bodies are filled with substrate and vegetation material capable of germinating. Plant seeds, sprouts of sedum species and moss spores in particular have proven suitable as the vegetation material capable of germinating.

The structured mats of such vegetation bodies serve to provide a hold and cohesion for the substrate material and the plant parts. The porous substrate arranged beneath the structured mat, usually made of coconut fibers, rock wool, textile fibers or suitable materials, serves to store water, provide drainage and a hold for the roots of the plants and as a dividing layer for particles that can be washed away.

The vegetation bodies known in the past have proven largely successful. However, it has been found that due to prolonged dry periods in particular, the vegetation bodies laid with butt seams begin to shrink, causing gaps to form between the individual sheets. These gaps not only interfere with the visual impression but also are also subject to the risk that wind forces can act on the bottom sides of the vegetation bodies, causing the vegetation bodies to be lifted due to suction, at least partially destroying the roof sodding. If substrate material is laid under the vegetation body, the substrate material may also be eroded due to wind effects through the shrink holes.

German Patent No. 3,815,662 A1 describes a two-dimensional structural part for use in gardening, having at least two independently structured layers, at least one of which has a self-supporting structure. The bottom layer is formed by a drainage plate with the vegetation plate on top of it as the top layer made mostly of natural organic material. The two layers are joined together to form a dimensionally stable structural part representing a unit. Both layers are designed as rectangles with essentially the same length and width dimensions, with the vegetation plate as the top layer being arranged with a translational offset with respect to the bottom drainage plate.

The offset between the vegetation plate and the drainage plate should yield the result that no continuous troughs can be formed between adjacent structural parts from the vegetation substrate applied subsequently to the vegetation plate to a flat roof on which the two-dimensional structural part is laid. With the known two-dimensional structural part, the offset is provided between the complete vegetation plate equipped with the vegetation substrate on the one hand and the drainage plate beneath it on the other hand, and since the vegetation plates themselves abut against one another without any offset, the shrinkage gaps mentioned above also cannot be avoided with this two-dimensional structural part.

SUMMARY OF THE INVENTION

Therefore, the object of the present invention is to create a vegetation body in the form of sheeting so that the consequences of shrinkage due to drying out can be compensated or prevented.

This object is achieved with a vegetation body in the form of sheeting.

According to the present invention, the structural mat of the vegetation body in the form of sheeting is arranged on the substrate in such a way that a first side edge area of the structural mat extends above a first side edge of the substrate, and an opposite second side edge area of the substrate extends beneath a second side edge of the structural mat, so that the structural mat and substrate of adjacent vegetation bodies overlap.

Although there is some overlapping with the known two-dimensional structural part according to German Patent No. 3,815,662 A1, this overlapping does not involve the vegetation body itself but instead involves a drainage plate installed beneath the vegetation body.

The present invention creates in a surprisingly simple manner a vegetation body in the form of sheeting with which the consequences of shrinkage due to drying out can be prevented or at least compensated. In other words, if two of the vegetation bodies according to this invention are laid side by side so they abut, the structural mat of one vegetation body will overlap the substrate of the other vegetation body. When the two vegetation bodies shrink due to drying, the structural mat of the one vegetation body will still cover at least an edge area of the substrate of the other vegetation body. The substrate of the one vegetation body is at least partially exposed here, but any wind forces occurring cannot act on the under sides of the vegetation bodies and/or erode the substrate material arranged beneath the vegetation bodies in case of need. The visual impression is hardly affected at all because the substrate is usually made of a relatively dark material, and furthermore, the edge areas of the vegetation bodies will be overgrown by the plants growing on the vegetation bodies.

When the plants on the vegetation body have grown for a long time, i.e., their roots have grown through the structural mat and into the substrate, shrinkage due to drying can be prevented almost entirely. In this case, the roots of the plants in the overhang area of the structural mat of one vegetation body will have grown into the substrate of another vegetation body. Due to this intermingling of roots, adjacent, abutting vegetation bodies are intermeshed to such an extent that shrinkage processes are stopped or at least greatly retarded.

The overlapping of the vegetation bodies is advantageously uniform on both sides, with the width of the overlap being 2 to 20 cm in a practical embodiment of the invention. In this way, a plurality of vegetation bodies according to this invention can be installed in such a way that the structural mats and the porous substrates abut against one another and the overhanging areas of the structural mat completely cover the exposed areas of the porous substrates. This makes it possible to create a closed composite of a plurality of vegetation bodies, with which a closed plant composite is guaranteed.

In preferred embodiments of the present invention, the porous substrate is a mat of renewable raw materials, such as coconut fibers, mineral wool or textile fibers. Such mats are very suitable for serving as a reservoir of water and nutrients for the plants; in addition, they also guarantee good drainage and provide a substrate for the plants. If a supply of nutrients from rotting processes is of primary concern, mats of coconut fibers or textile fibers will be preferred; if fire prevention is the primary concern, mats of mineral wool will be given preference.

In a preferred embodiment of the present invention, the substrate is a nonwoven of synthetic fibers. Such nonwovens are preferred in particular when the vegetation bodies are laid on a pitched roof because these nonwovens are capable of absorbing the resulting tensile forces.

In a practical embodiment of this invention, the structural mat and substrate each have a width of 0.5 to 2 m, and the vegetation body has a thickness of 0.5 to 10 cm.

In another embodiment of this invention, the structural mat is bonded to a nonwoven, preferably a polyester nonwoven, on its underside. The substrate and the nonwoven here overlap. Such a polyester nonwoven, which may be designed to be very thin, e.g., with a thickness of 0.2 to 3 mm, is very suitable for absorbing tensile forces on pitched roofs in particular, but at the same time it permits inter-growth of the roots of the plants into the porous substrate.

BRIEF DESCRIPTION OF THE DRAWINGS

Additional advantageous embodiments of this invention are derived from the specification, the drawings and the patent claims. The drawings show:

DETAILED DESCRIPTION OF PREFERRED EMBODIMENTS

Figure 1:
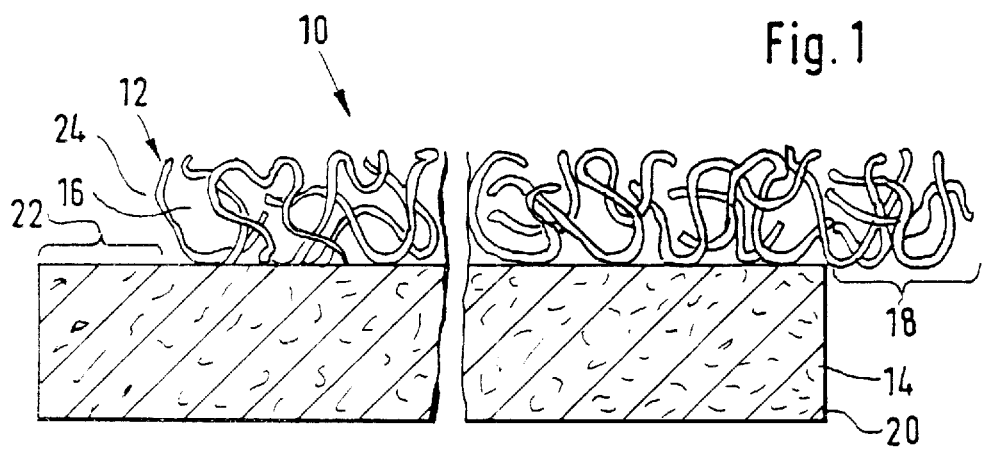
FIG. 1: a cross section through a first embodiment of the vegetation body in the form of sheeting according to this invention.

FIG. 1 shows a first embodiment of a vegetation body in the form of sheeting 10 according to this invention. This vegetation body has a structural mat 12 which is arranged on a porous substrate 14. In the embodiment illustrated in FIG. 1, the structural mat 12 is formed from a looped mat 16 which has a plurality of plastic fibers or the like forming a structure with interspaces in between. The thickness or height of the looped mat 16 may be approximately 10 mm. Instead of the looped mat 16, a woven mat (not shown) may also be used as the structural mat 12 according to this invention.

A side edge area 18 of the structural mat 12 extends over a side edge 20 of the substrate 14 and thus forms an overhang. On the opposite side of the vegetation body 10, a side edge area 22 of the substrate 14 extends beneath one side edge 24 of structural mat 12, thus forming a shoulder.

Structural mat 12 and porous substrate 14 thus overlap in the manner described above.

Figure 2:
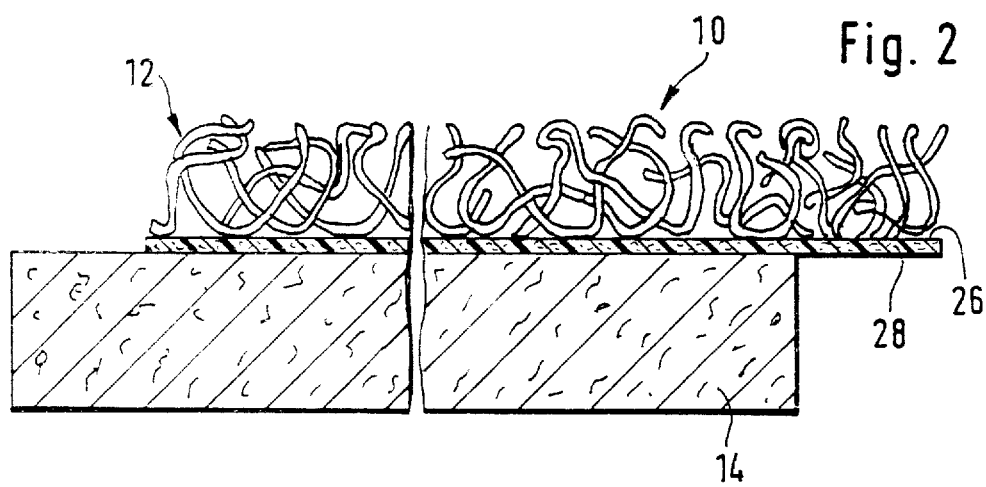
FIG. 2: a cross section through a second embodiment of the vegetation body in the form of sheeting according to this invention.

FIG. 2 illustrates a second embodiment of the vegetation body 10 according to the present invention. With this embodiment, the structural mat 12 is arranged on the substrate 14 as in the first embodiment according to FIG. 1, but the structural mat 12 here is provided with a polyester nonwoven 28 on its underside 26. This polyester nonwoven 28 serves to absorb the tensile forces occurring when the vegetation body is installed on a pitched roof.

Figure 3:
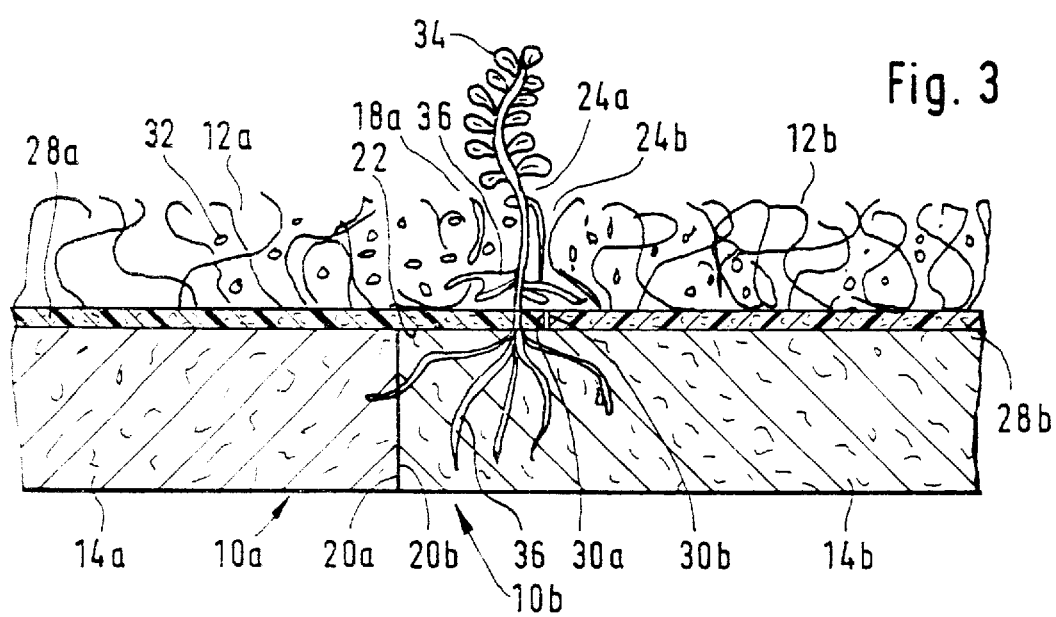
FIG. 3: a cross section through a partial area of two vegetation bodies according to this invention installed side by side.

FIG. 3 shows as an example the installation of two vegetation bodies 10a and 10b according to this invention. Both vegetation bodies 10a and 10b here correspond in design to vegetation body 10 from FIG. 2. Vegetation bodies 10a and 10b are laid with abutting side edges 20a and 20b of substrates 14a and 14b, and with abutting side edges 24a and 24b of structural mats 12a and 12b and with abutting edges 30a and 30b of polyester nonwovens 28a and 28b. The overlapping side edge area 18a of structural mat 12a of vegetation body 10a lies on side edge area 22b of porous substrate 14b of vegetation body 10b.

In the embodiment illustrated in FIG. 3, the structural mats 12a and 12b are filled at least partially with substrate material 32. This substrate material 32 may be an organic material such as humus, peat, bark mulch or the like, or as a granular mineral material such as sand, gravel or the like, or as a mixture of the two.

FIG. 3 also shows that a plant 34 has already taken hold with its roots 36 inside the hollow spaces of structural mat 12a and 12b as well as in substrate 14a and 14b. Due to this ability of the roots of plants 34 to intergrow, the overlapping areas of the structural mat 12a of vegetation body 10a become attached to the substrate 14b of vegetation body 10b.

What is claimed is:

1. A vegetation body sheeting (10) comprising
   a structural mat (12), which is located on at least one substrate (14), with the structural mat being filled with a substrate material (32) and with a plant material (34) capable of germinating;
   said structural mat (12) having an underside (26) and said underside of the structural mat (12) being bonded to a nonwoven layer (28);
   the nonwoven layer (28) is located on the substrate (14) in such a way that a first side edge area (18) of the nonwoven layer (28) extends over a first side edge (20) of the substrate (14), and an opposite second side edge area (22) of the substrate (14) extends beneath a second side edge (24) of the nonwoven layer (28), so that the nonwoven layer (28) and the substrate (14) of adjacent vegetation bodies (10) overlap one another; and
   in a cultivated condition of the vegetation bodies, the areas overlapping each other are connected with one another as a result of an inter-growth in conjunction with rooting activity of plants (34).

2. A vegetation body sheeting according to claim 1, wherein the nonwoven layer (28) is a polyester nonwoven layer.

3. A vegetation body sheeting according to claim 1, wherein the structural mat (12) is a looped mat filled with a substrate material (32);
   wherein said plant material (34) capable of germinating is selected from the group consisting of seeds, sprouts, spores and spore parts, and
   wherein the vegetation body sheeting is a fully sodded product.

4. A vegetation body sheeting according to claim 1, wherein the structural mat (12) is formed by an organic material.

5. A vegetation body sheeting according to claim 4, wherein the organic material of the structural mat (12) is coconut.

* * * * *